United States Patent [19]

Boyce et al.

[11] Patent Number: 5,596,140

[45] Date of Patent: Jan. 21, 1997

[54] METHOD OF MONITORING VIBRATIONS IN VEHICLES

[75] Inventors: Christopher R. Boyce, Solihull; Martin R. Haggett, Rugby, both of England

[73] Assignee: Rover Group Limited, Birmingham, England

[21] Appl. No.: 492,434

[22] Filed: Jun. 19, 1995

[30] Foreign Application Priority Data

Jun. 30, 1994 [GB] United Kingdom ............... 9413162

[51] Int. Cl.$^6$ .............................................. G01M 15/00
[52] U.S. Cl. ................................................. 73/105; 73/117.3
[58] Field of Search ............................ 73/1 H, 35.03, 73/105, 117.3, 118.1; 123/419, 436; 364/431.07, 431.08

[56] References Cited

U.S. PATENT DOCUMENTS

| | | |
|---|---|---|
| 4,561,389 | 12/1985 | Matsumoto . |
| 5,044,194 | 9/1991 | James et al. . |
| 5,381,688 | 1/1995 | Ikeda et al. ........................ 73/105 |
| 5,505,075 | 4/1996 | Pflrger et al. ..................... 73/105 |

FOREIGN PATENT DOCUMENTS

| | | |
|---|---|---|
| 0473079A2 | 3/1992 | European Pat. Off. . |
| 0551764A2 | 7/1993 | European Pat. Off. . |
| 2840383 | 4/1979 | Germany . |
| 2251949A | 7/1992 | Germany . |
| 2247319 | 2/1992 | United Kingdom . |

OTHER PUBLICATIONS

JP-A-02 099742, Satoru, "Controller Utilizing Detection of Vibration for Internal Combustion Engine", Jul. 3, 1990, vol. 014, No. 307 (M-0993), Abstract.

JP-A-05 071401, Takanobu, "Fuel Controller and Misfire Detector for Internal Combustion Engine", Jul. 22, 1993, vol. 017, No. 392 (M-1450), Abstract.

Primary Examiner—Richard Chilcot
Assistant Examiner—Eric S. McCall
Attorney, Agent, or Firm—Davis and Bujold

[57] ABSTRACT

A method of monitoring for misfire in an internal combustion engine of a vehicle includes sensing vibration of the vehicle by sensing the movement of liquid in a liquid reservoir e.g. by using the fuel level sensor 18 in the fuel tank 12 of the vehicle, determining when the vehicle is being vibrated in such a manner as will affect the misfire detection, and adapting monitoring when such vibration is sensed to avoid incorrect misfire detection.

22 Claims, 3 Drawing Sheets

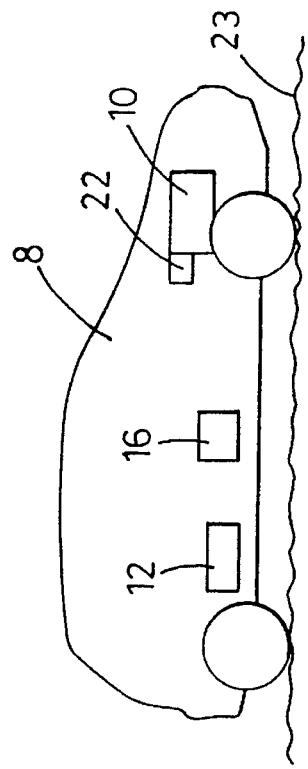
Fig. 1
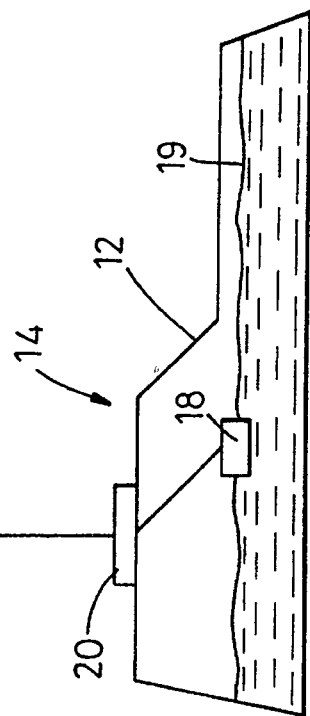
Fig. 2
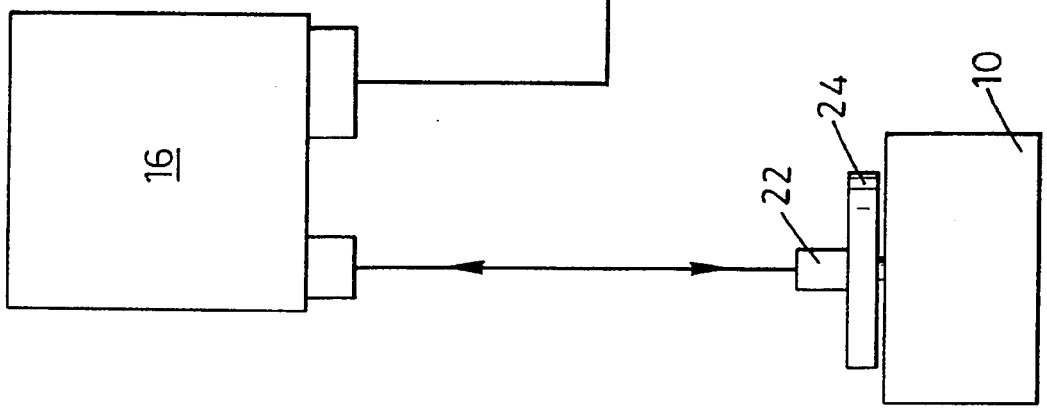

METHOD OF MONITORING VIBRATIONS IN VEHICLES

FIELD OF THE INVENTION

The invention relates to a method of monitoring vibrations of vehicles. It is particularly useful for monitoring for misfire in an internal combustion engine.

BACKGROUND TO THE INVENTION

Engine misfire leads to increased emissions and new regulations in California require misfire to be monitored. Engine misfire can be detected by monitoring the acceleration of the engine flywheel and checking that it is consistent with the firing of cylinders.

The applicant has recognised that where a vehicle is travelling over a rough road surface, the induced vibrations may have the same effect on the monitored acceleration of the flywheel as an engine misfire and thus the detection system may detect a misfire when none has in fact occurred.

The invention can also be used in other applications such as vehicle suspension systems where the vibration can be used as an indication of the evenness of a surface on which a vehicle is travelling

SUMMARY OF THE INVENTION

Accordingly the present invention provides method of controlling the functioning of a vehicle, the vehicle having a liquid reservoir containing liquid, and a liquid level monitor for monitoring the level of the liquid in the reservoir, the method comprising the steps of monitoring movement of the liquid in the liquid reservoir, determining from said movement when the vehicle is being vibrated in a predetermined manner and adapting the functioning of the vehicle when such vibration is detected.

Preferably the method further comprises the step of determining from the liquid movement the nature of a surface over which the vehicle is travelling.

Preferably the liquid is fuel and the reservoir is a fuel tank.

Preferably the vehicle has an internal combustion engine and a system for monitoring for misfire of the engine, wherein the functioning of the vehicle is adapted by adapting the operation of the misfire detection system. In this case the adapting step may comprise interrupting monitoring for misfire until the vehicle is not being vibrated in said predetermined manner.

Preferably the determining step comprises determining when the sensed vibration is at a predetermined frequency or within a predetermined range of frequencies, which may be the frequency or range of frequencies of vibrations induced by engine misfire.

Preferably the determining step comprises determining when the vibration is above a predetermined amplitude. The measured amplitude may be a root mean square value.

The determining step is preferably made on the basis of vibration sensed over a length of time which is substantially shorter than the period of any slopping movement. This slopping movement is generally at frequencies of the order of magnitude of the fundamental natural frequency of the liquid in the tank, which are generally substantially lower than the frequencies of interest.

The present invention also provides a vehicle having a liquid reservoir containing liquid, a liquid level monitor for monitoring the level of the liquid in the reservoir and producing a signal indicative of that level, and a control unit for controlling the functioning of the vehicle, wherein the control unit is arranged to use the signal from the liquid level monitor to detect when the vehicle is being vibrated in a predetermined manner and to adapt the functioning of the vehicle when such vibration is detected.

Preferably the vehicle further comprises an internal combustion engine and said function comprises monitoring for engine misfire.

The control means may be arranged to operate according to any aspects of the method described above.

The present invention further provides a method of determining the nature of a surface over which a vehicle is travelling, the vehicle having a liquid reservoir containing liquid, a liquid level monitor for monitoring the level of the liquid in the reservoir, the method comprising the steps of monitoring vibration of the vehicle by monitoring the movement of the liquid in the liquid reservoir, determining from said movement the nature of a surface over which a vehicle is travelling.

BRIEF DESCRIPTION OF THE DRAWINGS

FIG. 1 shows a vehicle according to the invention;

FIG. 2 is a schematic drawing of part of the vehicle of FIG. 1;

Referring to FIGS. 1 and 2 a vehicle 8 has an engine 10, a fuel tank 12, a fuel level sensor 14 and an engine control unit 16.

DESCRIPTION OF THE PREFERRED EMBODIMENTS

Figure 3:
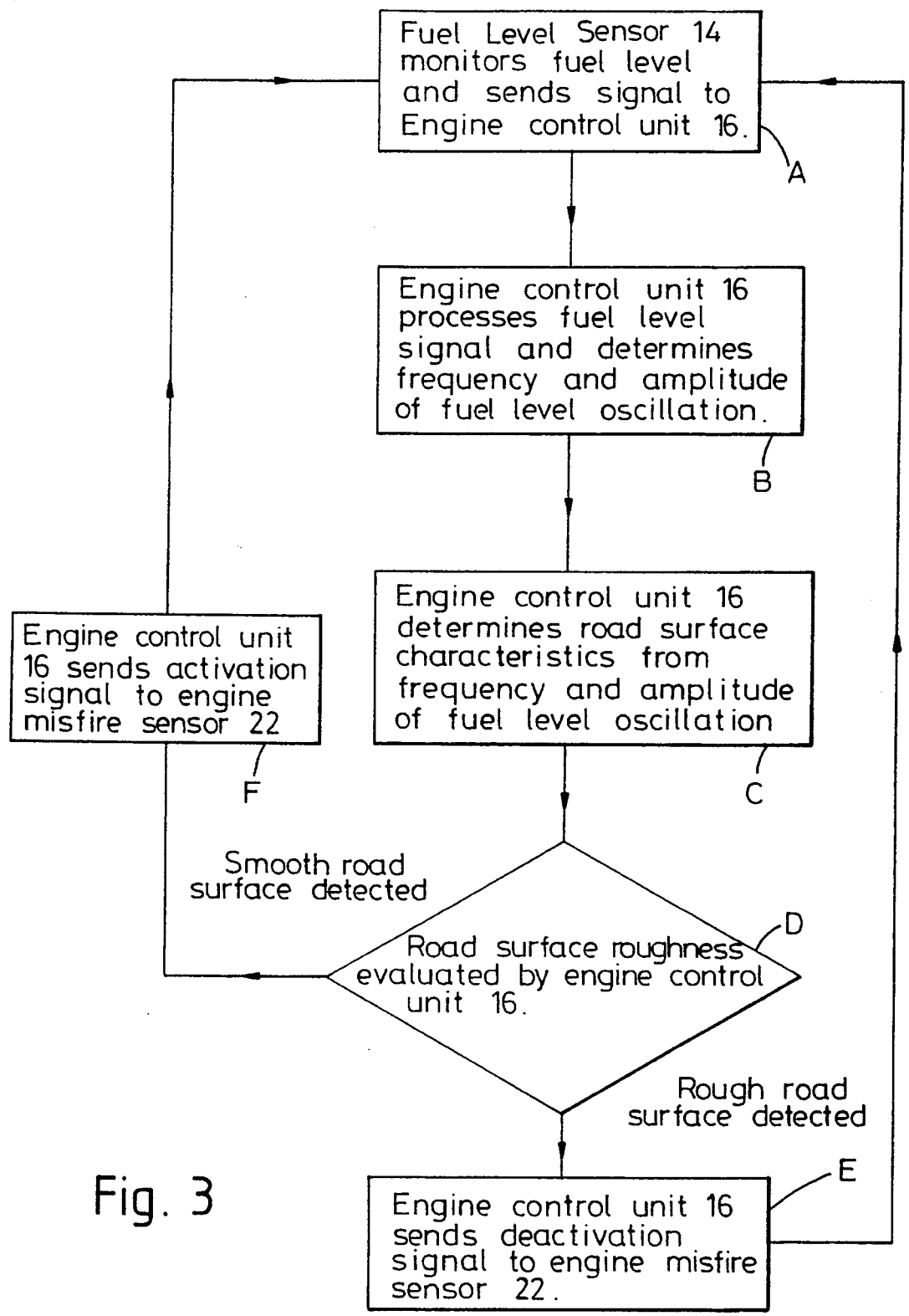
FIG. 3 is a block diagram depicting steps in a method in accordance with the invention.

The fuel level sensor 14 comprises a float 18, arranged to float on the surface of the fuel 19 in the tank 12, and a float position sensor 20 which determines the position of the float 18 in the tank, from which the fuel level can be calculated. The fuel level sensor 14 is connected to the engine control unit 16 which is also connected to an engine misfire sensor 22. The sensor 22 monitors the acceleration of engine flywheel 24 to determine the occurrence of a misfire.

Such sensors 22 are prone to indicate the occurrence of a misfire erroneously when the vehicle in which they are located is traversing a rough surface 23 as shown in FIG. 1. The method in accordance with one aspect of the invention, as shown in FIG. 3, is intended to eliminate erroneous detection of misfires.

In FIG. 3 a method in accordance with the invention is shown as a flow chart. At step A of the method the fuel sensor 14 senses the level of the fuel in the engine fuel tank 12 and sends a fuel level signal to the engine control unit 16.

At step B the engine control unit 16 determines the frequency of the oscillation of the fuel level about a reference level and its amplitude. The road surface characteristics can be determined from the frequency and amplitude of fuel level oscillation (step C).

In the event that the engine control unit determines, as described in more detail below, that the vehicle is traversing a rough road surface (step D), i.e. where high frequency oscillation of fuel level occurs, the engine control unit sends a deactivation signal (step E) to the engine misfire sensor 22 to prevent erroneous detection of a misfire. The process then returns to step A.

Where the engine control unit 16 determines that the vehicle is traversing a smooth road surface (step D) and where the misfire sensor has previously been deactivated it sends an activation signal (step F) to the engine misfire sensor 22 to resume misfire detection. The process then returns to step A.

Whilst the method has been described with discrete steps it is actually a continuous process with the fuel level oscillation signal being continuously monitored to alert the engine control unit 16 of the occurrence of a rough road surface to allow deactivation of the engine misfire sensor 22.

Figure 4:
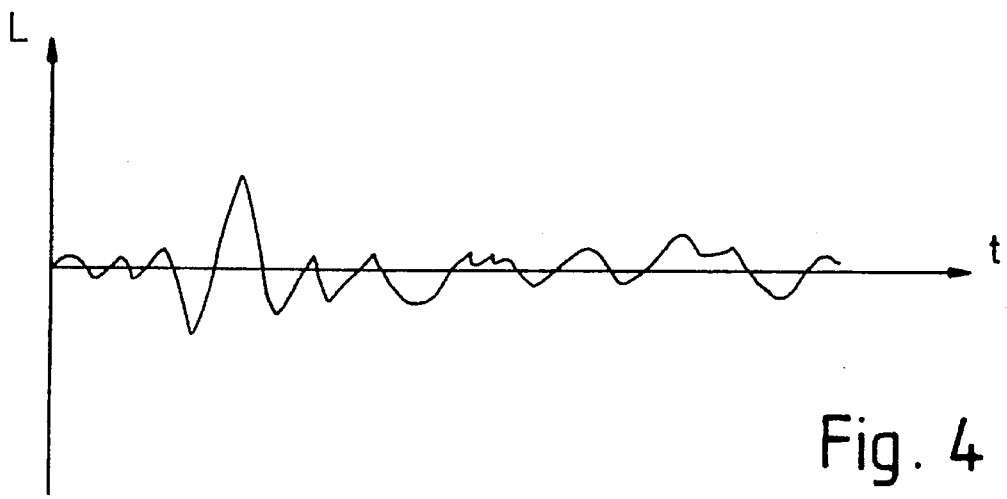
FIG. 4 is a graph showing a plot of fuel level against time as a result of a vehicle traversing a rough surface.
Figure 5:
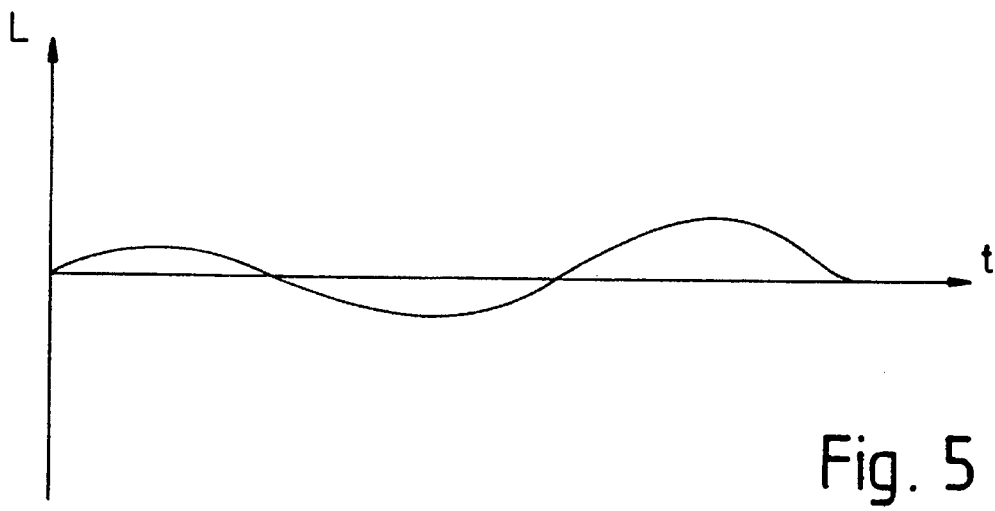
FIG. 5 is a graph similar to FIG. 4 showing a plot of fuel level against time as a result of fuel simply slopping around inside a tank.
Figure 6:
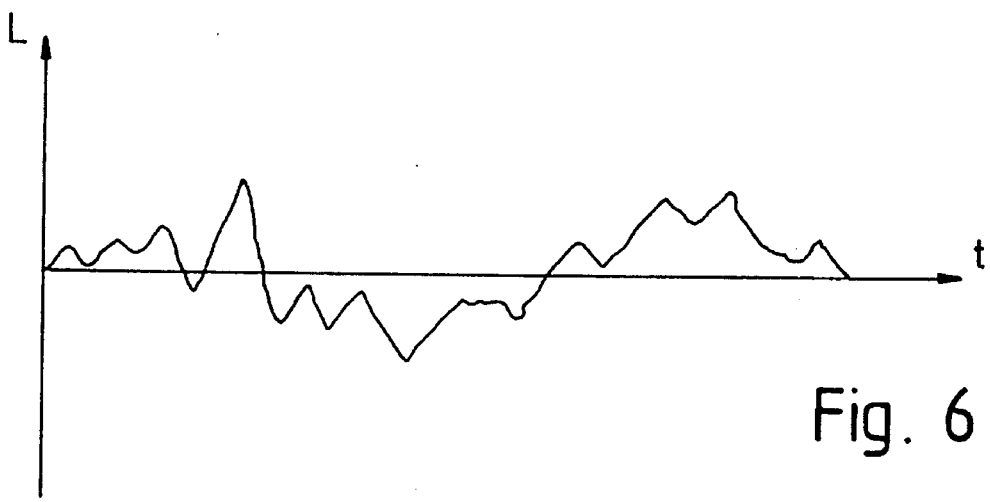
FIG. 6 is a graph similar to FIGS. 4 and 5 showing a plot produced by superimposing the FIG. 4 plot on the FIG. 5 plot.

Referring to FIGS. 4 to 6 which show graphs of fuel level against time in an engine fuel tank, FIG. 4 shows a plot for a vehicle traversing rough ground with a high frequency, high amplitude oscillation and FIG. 5 shows a much smoother, lower frequency oscillation which occurs from the simple slopping of fuel around inside the tank. This slopping movement has a frequency which is of the same order of magnitude as the fundamental natural frequency of the liquid in the tank. In practice the two waveforms of FIGS. 4 and 5 would be superimposed on each other to produce a waveform similar to that shown in FIG. 6.

In order to determine the nature of the surface over which the vehicle is travelling (step D above) the fuel level sensor 14 samples the position of the float 18 continually at a rate of about 200 times per second. From the resulting data the control unit 16 can calculate the mean fuel level. It can also filter out the components of the changes in fuel level which arise from slopping movement of the fuel. This produces a "mean" level which will vary with time as shown in FIG. 5 from which the vibrations of interest can be measured. This is done by calculating the root means square of the displacement of the fuel level from the "mean" level. Thereby the components which are caused by vibration of the vehicle at the frequencies of interest can be determined. From that information a mean amplitude, or some other indication of amplitude, and a dominant frequency, or some other indication of frequency, can be obtained. These give an indication of the amplitude and frequency of the vibrations in the vehicle caused by the surface over which the vehicle is travelling which might affect the misfire detection system.

It will be appreciated that the control 16 can be arranged to alter other functions of the vehicle in response to the detection of particular amplitudes or frequencies of vibration at step B or detection of particular road surface characteristics at step C. For example if the vehicle has an active suspension system the characteristics of the suspension can be modified to be softer or stiffer dependent on the type of ground over which the vehicle is travelling.

Also, whilst the invention has been described in relation to an engine fuel tank it will be appreciated that any liquid reservoir with a level sensor would perform equally as well, e.g. windscreen washer reservoir.

What is claimed is:

1. A method of controlling a functioning of a vehicle, the vehicle having a liquid reservoir containing liquid, and a liquid level monitor for monitoring the level of the liquid in the reservoir, the method comprising the steps of monitoring movement of the liquid in the liquid reservoir, determining from said movement when the vehicle is being vibrated in a predetermined manner and adapting the functioning of the vehicle when such vibration is detected.

2. A method according to claim 1 wherein the method further comprises the step of determining from the liquid movement a nature of a surface over which the vehicle is travelling.

3. A method as claimed in claim 1, wherein the liquid is fuel and the reservoir is a fuel tank.

4. A method as claimed in claim 1, wherein the vehicle has an internal combustion engine and a system for monitoring for misfire of the engine, wherein the functioning of the vehicle is adapted by adapting the operation of the misfire detection system.

5. A method as claimed in claim 4 wherein the adapting step comprises interrupting monitoring for misfire until the vehicle is not being vibrated in said predetermined manner.

6. A method as claimed in claim 4 wherein the vehicle includes a flywheel for the engine and an operation of the misfire detection system which is interrupted includes monitoring the acceleration of the flywheel.

7. A method as claimed in claim 1 wherein the determining step comprises determining when the vehicle is being vibrated at a predetermined frequency.

8. A method as claimed in claim 1 wherein the determining step comprises determining when the vehicle is being vibrated within a predetermined range of frequencies.

9. A method as claimed in claim 1 wherein the liquid has a fundamental natural frequency of vibration, and exhibits a range -of slopping frequencies which are of the same order of magnitude as the fundamental natural frequency, and, in making the determination, vibrations of the liquid at the slopping frequencies are filtered out.

10. A method as claimed in claim 7 wherein the determining step comprises determining when the vibration of the vehicle at said frequency is above a predetermined amplitude.

11. A method as claimed in claim 8 wherein the determining step comprises determining when the amplitude of the vibration of the vehicle within said range of frequencies is above a predetermined level.

12. A vehicle having a liquid reservoir containing liquid, a liquid level monitor for monitoring the level of the liquid in the reservoir and producing a signal indicative of that level, and a control unit for controlling a functioning of the vehicle, wherein the control unit is arranged to use the signal from the liquid level monitor to detect when the vehicle is being vibrated in a predetermined manner and to adapt the functioning of the vehicle when such vibration is detected.

13. A vehicle according to claim 12 wherein the control unit is arranged to determine from the liquid movement a nature of a surface over which the vehicle is travelling.

14. A vehicle as claimed in claim 12, wherein the liquid is fuel and the reservoir is a fuel tank.

15. A vehicle as claimed in claim 12 further comprising an internal combustion engine and a system for monitoring for misfire of the engine wherein the control unit is arranged to adapting the operation of the misfire detection system when said vibration is detected.

16. A vehicle as claimed in claim 15 wherein the control unit is arranged to interrupt monitoring for misfire while said vibration is detected.

17. A vehicle as claimed in claim 15 further including a flywheel for the engine, wherein the misfire detection system is arranged to monitor for misfire by monitoring an acceleration of the flywheel.

18. A vehicle as claimed in claim 12 wherein the control unit is arranged to determine when the vehicle is being vibrated at a predetermined frequency.

19. A vehicle as claimed in claim 12 wherein the control unit is arranged to determine when the vehicle is being vibrated within a predetermined range of frequencies.

20. A vehicle as claimed in claim 12 wherein the liquid has a fundamental natural frequency of vibration, and exhibits a range of slopping frequencies which are of the same order of magnitude as the fundamental natural frequency, and the control unit is arranged to filter out vibrations of the liquid at the slopping frequencies when making a determination.

21. A vehicle as claimed in claim 18 wherein the control unit is arranged to determine when the amplitude of the vibration at said frequency is above a predetermined level.

22. A vehicle as claimed in claim 19 wherein the control unit is arranged to determine when the amplitude of the vibration within said range of frequencies is above a predetermined level.

* * * * *